US012389944B2

(12) United States Patent
Choi et al.

(10) Patent No.: US 12,389,944 B2
(45) Date of Patent: Aug. 19, 2025

(54) HYBRID GEL-FIBER WICK FOR USE IN A VAPORIZER DEVICE

(71) Applicant: JUUL Labs, Inc., San Francisco, CA (US)

(72) Inventors: Won C. Choi, San Francisco, CA (US); Namhey Lee, Hayward, CA (US)

(73) Assignee: JUUL Labs, Inc., Washington, DC (US)

( * ) Notice: Subject to any disclaimer, the term of this patent is extended or adjusted under 35 U.S.C. 154(b) by 457 days.

(21) Appl. No.: 17/862,615

(22) Filed: Jul. 12, 2022

(65) Prior Publication Data

US 2022/0354173 A1 Nov. 10, 2022

Related U.S. Application Data

(63) Continuation of application No. PCT/US2021/013194, filed on Jan. 13, 2021.

(60) Provisional application No. 62/960,886, filed on Jan. 14, 2020.

(51) Int. Cl.

| | |
|---|---|
| ***A24F 40/44*** | (2020.01) |
| ***A24F 40/10*** | (2020.01) |
| ***A24F 40/42*** | (2020.01) |
| ***A24F 40/46*** | (2020.01) |
| ***A24F 40/70*** | (2020.01) |
| ***H05B 3/22*** | (2006.01) |

(52) U.S. Cl.

CPC .............. *A24F 40/44* (2020.01); *A24F 40/10* (2020.01); *A24F 40/42* (2020.01); *A24F 40/46* (2020.01); *A24F 40/70* (2020.01); *H05B 3/22* (2013.01)

(58) Field of Classification Search

None

See application file for complete search history.

(56) References Cited

U.S. PATENT DOCUMENTS

| | | | |
|---|---|---|---|
| 4,312,367 | A | 1/1982 | Seeman |
| 6,090,331 | A | 7/2000 | Schwarz et al. |
| 8,314,591 | B2 | 11/2012 | Terry et al. |

(Continued)

FOREIGN PATENT DOCUMENTS

| | | | |
|---|---|---|---|
| CN | 100589726 | C | 4/2007 |
| CN | 204426692 | U | 7/2015 |

(Continued)

OTHER PUBLICATIONS

VN 10020480 B English translation obtained from Search, pp. 1-17 (Year: 2019).*

(Continued)

*Primary Examiner* — Philip Y Louie

*Assistant Examiner* — Madeleine P Delacruz

(74) *Attorney, Agent, or Firm* — Mintz, Levin, Cohn, Ferris, Glovsky, and Popeo, P.C.

(57) ABSTRACT

A vaporization device includes a cartridge having a reservoir that holds a vaporizable material, a heating element, and a wicking element that can draw the vaporizable material to the heating element to be vaporized. The vaporizer cartridge is configured for coupling to a vaporizer device body and containing a vaporizable material. Various embodiments of the vaporizer cartridge are described that include one or more features for a hybrid gel-fiber wick. Related systems, methods, and articles of manufacture are also described.

17 Claims, 11 Drawing Sheets

(56) References Cited

U.S. PATENT DOCUMENTS

| | | | |
|---|---|---|---|
| 8,746,240 | B2 | 6/2014 | Terry et al. |
| 9,004,073 | B2 | 4/2015 | Tucker et al. |
| 9,095,175 | B2 | 8/2015 | Terry et al. |
| 9,198,466 | B2 | 12/2015 | Liu |
| 9,247,773 | B2 | 2/2016 | Memari et al. |
| 9,259,035 | B2 | 2/2016 | Terry et al. |
| 9,380,812 | B2 | 7/2016 | Chung |
| 9,408,416 | B2 | 8/2016 | Monsees et al. |
| 9,439,454 | B2 | 9/2016 | Fernando et al. |
| 9,554,597 | B2 | 1/2017 | Liu |
| 9,555,203 | B2 | 1/2017 | Terry et al. |
| 9,723,872 | B2 | 8/2017 | Liu |
| 9,743,691 | B2 | 8/2017 | Minskoff et al. |
| 9,999,250 | B2 | 6/2018 | Minskoff et al. |
| 10,136,672 | B2 | 11/2018 | Minskoff et al. |
| 10,159,278 | B2 | 12/2018 | Minskoff et al. |
| 10,244,793 | B2 | 4/2019 | Monsees et al. |
| 10,300,225 | B2 | 5/2019 | Terry et al. |
| 10,328,443 | B2 | 6/2019 | Ricketts et al. |
| 10,772,352 | B2 | 9/2020 | Mishra et al. |
| 10,786,010 | B2 | 9/2020 | Hubbard et al. |
| 10,849,358 | B2 | 12/2020 | Mishra et al. |
| 11,160,936 | B2 | 11/2021 | Bache et al. |
| 2005/0172976 | A1 | 8/2005 | Newman et al. |
| 2006/0191546 | A1 | 8/2006 | Takano |
| 2007/0014549 | A1 | 1/2007 | Demarest et al. |
| 2007/0295347 | A1 | 12/2007 | Paine, III et al. |
| 2008/0056691 | A1 | 3/2008 | Wingo et al. |
| 2008/0241255 | A1 | 10/2008 | Rose |
| 2010/0065653 | A1 | 3/2010 | Wingo et al. |
| 2011/0083684 | A1 | 4/2011 | Luan et al. |
| 2011/0277757 | A1 | 11/2011 | Terry et al. |
| 2013/0228191 | A1 | 9/2013 | Newton |
| 2014/0209105 | A1 | 7/2014 | Sears et al. |
| 2014/0232707 | A1 | 8/2014 | Alschinger et al. |
| 2014/0246031 | A1 | 9/2014 | Liu |
| 2014/0338684 | A1 | 11/2014 | Liu |
| 2015/0136158 | A1 | 5/2015 | Stevens et al. |
| 2015/0209530 | A1 | 7/2015 | White |
| 2015/0216234 | A1 | 8/2015 | Chung |
| 2015/0257444 | A1 | 9/2015 | Chung |
| 2015/0328415 | A1 | 11/2015 | Minskoff et al. |
| 2015/0374035 | A1 | 12/2015 | Sanchez et al. |
| 2016/0135506 | A1 | 5/2016 | Sanchez et al. |
| 2016/0143360 | A1 | 5/2016 | Sanchez et al. |
| 2016/0262459 | A1 | 9/2016 | Monsees et al. |
| 2016/0345631 | A1 | 12/2016 | Monsees et al. |
| 2017/0030882 | A1 | 2/2017 | Skoda |
| 2017/0181427 | A1 | 6/2017 | Shani et al. |
| 2017/0188626 | A1 | 7/2017 | Davis et al. |
| 2017/0280769 | A1 | 10/2017 | Li et al. |
| 2017/0295846 | A1 | 10/2017 | Liu |
| 2018/0020722 | A1 | 1/2018 | Davis et al. |
| 2018/0070633 | A1 | 3/2018 | Phillips et al. |
| 2018/0084823 | A1 | 3/2018 | Fuisz et al. |
| 2018/0141073 | A1 | 5/2018 | Tan et al. |
| 2018/0279673 | A1 | 10/2018 | Sebastian et al. |
| 2018/0296777 | A1 | 10/2018 | Terry et al. |
| 2018/0368472 | A1 | 12/2018 | Mishra et al. |
| 2022/0046979 | A1 | 2/2022 | Campitelli |

FOREIGN PATENT DOCUMENTS

| | | | | | |
|---|---|---|---|---|---|
| CN | 105962419 | A | | 9/2016 | |
| CN | 109744577 | A | | 5/2019 | |
| CN | 111356378 | A | | 6/2020 | |
| CN | 112023203 | B | | 12/2020 | |
| EP | 2693902 | B1 | | 2/2014 | |
| EP | 3292775 | B1 | | 3/2018 | |
| EP | 3402347 | B1 | | 11/2018 | |
| EP | 3487564 | B1 | | 5/2019 | |
| EP | 3510649 | B1 | | 7/2019 | |
| EP | 3732938 | B1 | | 11/2020 | |
| EP | 3943186 | B1 | | 1/2022 | |
| JP | 2009505649 | A | | 2/2009 | |
| JP | 2015500025 | A | | 1/2015 | |
| JP | 2015504653 | A | | 2/2015 | |
| KR | 101622528 | B1 | | 5/2016 | |
| VN | 10020480 | B | * | 2/2019 | ............ A24F 40/40 |
| WO | WO-9853866 | A1 | | 12/1998 | |
| WO | WO-0028842 | A1 | | 5/2000 | |
| WO | WO-2011146174 | A2 | | 11/2011 | |
| WO | WO-2013030202 | A1 | | 3/2013 | |
| WO | WO-2014144678 | A2 | | 9/2014 | |
| WO | WO-2015032093 | A1 | | 3/2015 | |
| WO | WO-2016055653 | A1 | | 4/2016 | |
| WO | WO-2017205838 | A1 | | 11/2017 | |
| WO | WO-2019193311 | A1 | | 10/2019 | |
| WO | WO-2020161336 | A1 | | 8/2020 | |
| WO | WO-2021127097 | A2 | | 6/2021 | |
| WO | WO-2021127101 | A1 | | 6/2021 | |
| WO | WO-2021127168 | A1 | | 6/2021 | |

OTHER PUBLICATIONS

Li et al. (Oct. 2012) "Effect of Acid-Catalyzed Sol-Gel Silica coating on the Properties of Cotton Fabric", The Journal of The Textile Institute, vol. 103 (10) pp. 1099-1107.

* cited by examiner

| Formulation | Average TPM (mg/puff) | Standard Deviation |
|---|---|---|
| 1:1 TEOS/PGVG | 0.91 | 0.08 |
| 1:3 TEOS/PGVG | 1.16 | 0.08 |
| 1:5 TEOS/PGVG | 1.71 | 0.11 |

HYBRID GEL-FIBER WICK FOR USE IN A VAPORIZER DEVICE

CROSS REFERENCE TO RELATED APPLICATIONS

This application is a continuation application, filed under 35 U.S.C. § 120, of PCT International Patent Application No. PCT/US21/13194 with an International Filing Date of Jan. 13, 2021, and entitled "Hybrid Gel-Fiber Wick for Use in a Vaporizer Device," which claims priority to U.S. Provisional Patent Application No. 62/960,886 filed on Jan. 14, 2020, and entitled "Hybrid Gel-Fiber Wick for Use in a Vaporizer Device." the disclosures of all of which is-are incorporated by reference in their entirety and for all purposes.

TECHNICAL FIELD

The subject matter described herein relates to vaporizer devices, including hybrid gel-fiber wicks for use in vaporizer devices.

BACKGROUND

Vaporizer devices, which can also be referred to as vaporizers, electronic vaporizer devices, or e-vaporizer devices, can be used for delivery of an aerosol (for example, a vapor-phase and/or condensed-phase material suspended in a stationary or moving mass of air or some other gas carrier) containing one or more active ingredients by inhalation of the aerosol by a user of the vaporizing device. For example, electronic nicotine delivery systems (ENDS) include a class of vaporizer devices that are battery powered and that can be used to simulate the experience of smoking, but without burning of tobacco or other substances. Vaporizers are gaining increasing popularity both for prescriptive medical use, in delivering medicaments, and for consumption of tobacco, nicotine, and other plant-based materials. Vaporizer devices can be portable, self-contained, and/or convenient for use.

In use of a vaporizer device, the user inhales an aerosol, colloquially referred to as "vapor," which can be generated by a heating element that vaporizes (e.g., causes a liquid or solid to at least partially transition to the gas phase) a vaporizable material, which can be liquid, a solution, a solid, a paste, a wax, and/or any other form compatible for use with a specific vaporizer device. The vaporizable material used with a vaporizer can be provided within a cartridge for example, a separable part of the vaporizer device that contains vaporizable material) that includes an outlet (for example, a mouthpiece) for inhalation of the aerosol by a user.

To receive the inhalable aerosol generated by a vaporizer device, a user may, in certain examples, activate the vaporizer device by taking a puff, by pressing a button, and/or by some other approach. A puff as used herein can refer to inhalation by the user in a manner that causes a volume of air to be drawn into the vaporizer device such that the inhalable aerosol is generated by a combination of the vaporized vaporizable material with the volume of air.

An approach by which a vaporizer device generates an inhalable aerosol from a vaporizable material involves heating the vaporizable material in a vaporization chamber (e.g., a heater chamber) to cause the vaporizable material to be converted to the gas (or vapor) phase. A vaporization chamber can refer to an area or volume in the vaporizer device within which a heat source (for example, a conductive, convective, and/or radiative heat source) causes heating of a vaporizable material to produce a mixture of air and vaporized material to form a vapor for inhalation of the vaporizable material by a user of the vaporization device.

In some implementations, the vaporizable material can be drawn out of a reservoir and into the vaporization chamber via a wicking element (e.g., a wick). Drawing of the vaporizable material into the vaporization chamber can be at least partially due to capillary action provided by the wick as the wick pulls the vaporizable material along the wick in the direction of the vaporization chamber.

Vaporizer devices can be controlled by one or more controllers, electronic circuits (for example, sensors, heating elements), and/or the like on the vaporizer. Vaporizer devices can also wirelessly communicate with an external controller for example, a computing device such as a smartphone).

SUMMARY

In certain aspects of the current subject matter, challenges associated with consistent aerosol production and delivery by vaporizer devices can be addressed by inclusion of one or more of the features described herein or comparable/equivalent approaches as would be understood by one of ordinary skill in the art. Aspects of the current subject matter relate to systems, methods and apparatus using hybrid gel-fiber wicks for consistent, enhanced aerosol delivery in a vaporizer device.

In an aspect, a hybrid gel-fiber wick is provided, including a plurality of fibers bundled together to form a fiber core. The fiber core has a first end portion, a second end portion, and a middle portion therebetween, and a gel coating a portion of the fiber core.

In another interrelated aspect, a cartridge is provided. The cartridge includes the hybrid gel-fiber wick as described and illustrated herein including embodiments.

In another interrelated aspect, a device is provided, including a receptacle configured to receive the cartridge as described and illustrated herein, including embodiments.

In another interrelated aspect, a method of manufacturing a vaporizer cartridge is provided. The method includes providing a plurality of fibers bundled together to form a fiber core, the fiber core having a first end portion, a second end portion, and a middle portion therebetween. The method further includes wrapping the middle portion of the fiber core with a heating element, coating the middle portion of the fiber core with a gel to form a hybrid gel-fiber wick, and inserting the gel-fiber hybrid wick into the vaporizer cartridge, such that the middle portion of the fiber core is disposed in an atomizer, and the first end portion and the second end portion of the fiber core are disposed in a reservoir of the vaporizer cartridge.

In some variations, one or more of the following features may optionally be included in any feasible combination.

The middle portion of the fiber core can include the gel coating. The first end portion and/or the second end portion of the fiber core may not include the gel coating.

The hybrid gel-fiber wick can further include a heating element, wherein at least a portion of the heating element can be disposed between the fiber core and the gel coating. The heating element can be a nichrome wire. The heating element can be spirally wound around the fiber core. The fiber core can include a cotton material. The fiber core can include a silica material.

The gel can include a polymer. The gel can include silicon. The gel can include a silane. The gel can include a silicate. The gel can include tetraethoxysilane. The gel coating can be 250 microns to 500 microns in thickness.

The cartridge can include a reservoir configured to contain a vaporizable material, and a portion of the hybrid gel-fiber wick can be disposed within the reservoir. The first end portion and/or the second end portion of the fiber core can be disposed within the reservoir. The cartridge can include an atomizer configured to vaporize the vaporizable material. The middle portion of the fiber core can be disposed within the atomizer.

The method can further include filling the reservoir with a vaporizable material. Coating the middle portion of the fiber core with a gel can include dispensing the gel on the middle portion of the fiber core with a needle to form the gel coating. Coating the middle portion of the fiber core with a gel can include printing the gel on the middle portion of the fiber core with a printer to form the gel coating. Coating the middle portion of the fiber core with a gel can include molding the gel on the middle portion of the fiber core using a mold to form the gel coating. The gel can include a compound containing silicon. The gel can include a silane. The gel can include a silicate. The gel can include tetraethoxysilane. The gel coating can be 250 microns to 500 microns in thickness.

The hybrid gel-fiber wick can have a total particulate matter (TPM) per puff at least 50% greater than a TPM of the fiber core not including the gel coating.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF THE DRAWINGS

The accompanying drawings, which are incorporated into and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter include methods, apparatuses, articles of manufacture, and systems relating to vaporization of one or more materials for inhalation by a user. Example implementations include vaporizer devices and systems including vaporizer devices. The term "vaporizer device" as used in the following description and claims refers to any of a self-contained apparatus, an apparatus that includes two or more separable parts (for example, a vaporizer body that includes a battery and other hardware, and a cartridge that includes a vaporizable material), and/or the like. A "vaporizer system," as used herein, can include one or more components, such as a vaporizer device. Examples of vaporizer devices consistent with implementations of the current subject matter include electronic vaporizers, electronic nicotine delivery systems (ENDS), and/or the like. In general, such vaporizer devices are hand-held devices that heat (such as by convection, conduction, radiation, and/or some combination thereof) a vaporizable material to provide an inhalable dose of the material. The vaporizable material used with a vaporizer device can be provided within a cartridge (for example, a part of the vaporizer that contains the vaporizable material in a reservoir or other container) which can be refillable when empty, or disposable such that a new cartridge containing additional vaporizable material of a same or different type can be used). A vaporizer device can be a cartridge-using vaporizer device, a cartridge-less vaporizer device, or a multi-use vaporizer device capable of use with or without a cartridge. For example, a vaporizer device can include a heating chamber (for example, an oven or other region in which material is heated by a heating element) configured to receive a vaporizable material directly into the heating chamber, and/or a reservoir or the like for containing the vaporizable material. In some implementations, a vaporizer device can be configured for use with a liquid vaporizable material (for example, a carrier solution in which an active and/or inactive ingredient(s) are suspended or held in solution, or a liquid form of the vaporizable material itself), a paste, a wax, and/or a solid vaporizable material. A solid vaporizable material can include a plant material that emits some part of the plant material as the vaporizable material (for example, some part of the plant material remains as waste after the material is vaporized for inhalation by a user) or optionally can be a solid form of the vaporizable material itself, such that all of the solid material can eventually be vaporized for inhalation. A liquid vaporizable material can likewise be capable of being completely vaporized, or can include some portion of the liquid material that remains after all of the material suitable for inhalation has been vaporized.

Figure 1A:
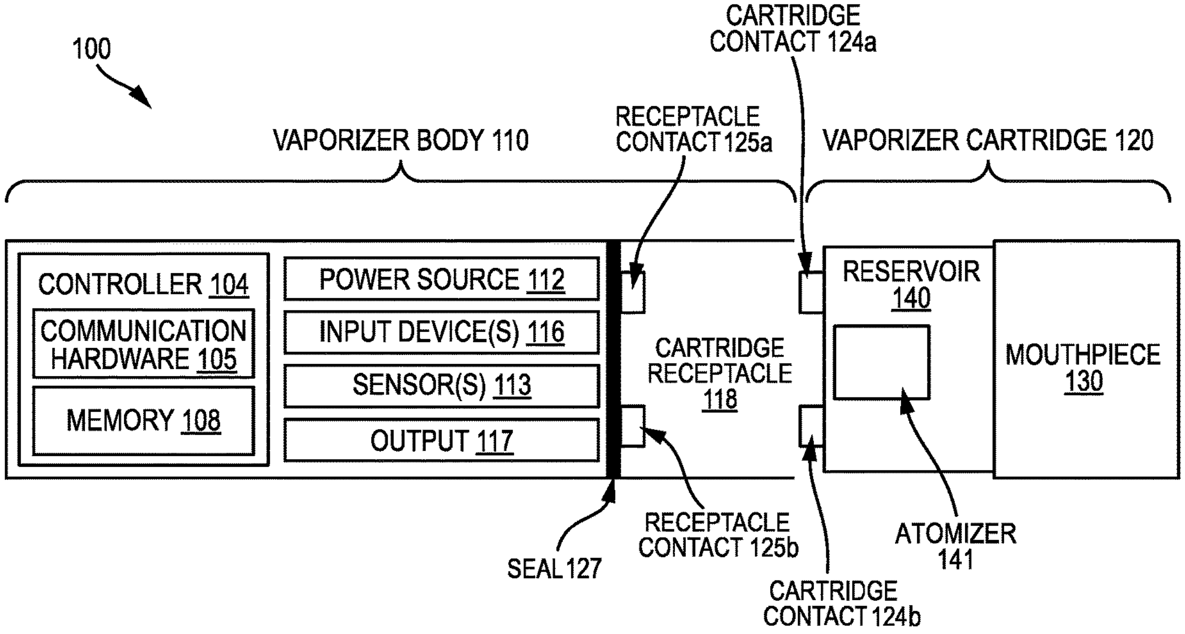
FIG. 1A is a block diagram of a vaporizer device.

Referring to the block diagram of FIG. 1A, a vaporizer device 100 can include a power source 112 (for example, a battery, which can be a rechargeable battery), and a controller 104 (for example, a processor, circuitry, etc. capable of executing logic) for controlling delivery of heat to an atomizer 141 to cause a vaporizable material 102 to be converted from a condensed form (such as a solid, a liquid, a solution, a suspension, a part of an at least partially unprocessed plant material, etc.) to the gas phase. The controller 104 can be part of one or more printed circuit boards (PCBs) consistent with certain implementations of the current subject matter. After conversion of the vaporizable material 102 to the gas phase, at least some of the vaporizable material 102 in the gas phase can condense to form particulate matter in at least a partial local equilibrium with the gas phase as part of an aerosol, which can form some or all of an inhalable dose provided by the vaporizer device 100 during a user's puff or draw on the vaporizer device 100. It should be appreciated that the interplay between gas and condensed phases in an aerosol generated by a vaporizer device 100 can be complex and dynamic, due to factors such as ambient temperature, relative humidity, chemistry, flow conditions in airflow paths (both inside the vaporizer and in the airways of a human or other animal), and/or mixing of the vaporizable material 102 in the gas phase or in the aerosol phase with other air streams, which can affect one or more physical parameters of an aerosol. In some vaporizer devices, and particularly for vaporizer devices configured for delivery of volatile vaporizable materials, the inhalable dose can exist predominantly in the gas phase (for example, formation of condensed phase particles can be very limited).

The atomizer 141 in the vaporizer device 100 can be configured to vaporize a vaporizable material 102. The vaporizable material 102 can be a liquid. Examples of the vaporizable material 102 include neat liquids, suspensions, solutions, mixtures, and/or the like. The atomizer 141 can include a wicking element (i.e., a wick) configured to convey an amount of the vaporizable material 102 to a part of the atomizer 141 that includes a heating element (not shown in FIG. 1A).

For example, the wicking element can be configured to draw the vaporizable material 102 from a reservoir 140 configured to contain the vaporizable material 102, such that the vaporizable material 102 can be vaporized by heat delivered from a heating element. The wicking element can also optionally allow air to enter the reservoir 140 and replace the volume of vaporizable material 102 removed. In some implementations of the current subject matter, capillary action can pull vaporizable material 102 into the wick for vaporization by the heating element, and air can return to the reservoir 140 through the wick to at least partially equalize pressure in the reservoir 140. Other methods of allowing air back into the reservoir 140 to equalize pressure are also within the scope of the current subject matter.

As used herein, the terms "wick" or "wicking element" include any material capable of causing fluid motion via capillary pressure.

The heating element can include one or more of a conductive heater, a radiative heater, and/or a convective heater. One type of heating element is a resistive heating element, which can include a material (such as a metal or alloy, for example a nickel-chromium (nichrome) alloy, or a non-metallic resistor) configured to dissipate electrical power in the form of heat when electrical current is passed through one or more resistive segments of the heating element. In some implementations of the current subject matter, the atomizer 141 can include a heating element which includes a resistive coil or other heating element wrapped around, positioned within, integrated into a bulk shape of, pressed into thermal contact with, or otherwise arranged to deliver heat to a wicking element, to cause the vaporizable material 102 drawn from the reservoir 140 by the wicking element to be vaporized for subsequent inhalation by a user in a gas and/or a condensed (for example, aerosol particles or droplets) phase. Other wicking elements, heating elements, and/or atomizer assembly configurations are also possible.

Certain vaporizer devices may, additionally or alternatively, be configured to create an inhalable dose of the vaporizable material 102 in the gas phase and/or aerosol phase via heating of the vaporizable material 102. The vaporizable material 102 can be a solid-phase material (such as a wax or the like) or plant material (for example, tobacco leaves and/or parts of tobacco leaves). In such vaporizer devices, a resistive heating element can be part of, or otherwise incorporated into or in thermal contact with, the walls of an oven or other heating chamber into which the vaporizable material 102 is placed. Alternatively, a resistive heating element or elements can be used to heat air passing through or past the vaporizable material 102, to cause convective heating of the vaporizable material 102. In still other examples, a resistive heating element or elements can be disposed in intimate contact with plant material such that direct conductive heating of the plant material occurs from within a mass of the plant material, as opposed to only by conduction inward from walls of an oven.

The heating element can be activated in association with a user puffing (i.e., drawing, inhaling, etc.) on a mouthpiece 130 of the vaporizer device 100 to cause air to flow from an air inlet, along an airflow path that passes the atomizer 141 (i.e., wicking element and heating element). Optionally, air can flow from an air inlet through one or more condensation areas or chambers, to an air outlet in the mouthpiece 130. Incoming air moving along the airflow path moves over or through the atomizer 141, where vaporizable material 102 in the gas phase is entrained into the air. The heating element can be activated via the controller 104, which can optionally be a part of a vaporizer body 110 as discussed herein, causing current to pass from the power source 112 through a circuit including the resistive heating element, which is optionally part of a vaporizer cartridge 120 as discussed herein. As noted herein, the entrained vaporizable material 102 in the gas phase can condense as it passes through the remainder of the airflow path such that an inhalable dose of the vaporizable material 102 in an aerosol form can be delivered from the air outlet (for example, the mouthpiece 130) for inhalation by a user.

Activation of the heating element can be caused by automatic detection of a puff based on one or more signals generated by one or more of a sensor 113. The sensor 113 and the signals generated by the sensor 113 can include one or more of: a pressure sensor or sensors disposed to detect pressure along the airflow path relative to ambient pressure (or optionally to measure changes in absolute pressure), a motion sensor or sensors (for example, an accelerometer) of the vaporizer device 100, a flow sensor or sensors of the vaporizer device 100, a capacitive lip sensor of the vaporizer device 100, detection of interaction of a user with the vaporizer device 100 via one or more input devices 116 (for example, buttons or other tactile control devices of the vaporizer device 100), receipt of signals from a computing device in communication with the vaporizer device 100, and/or via other approaches for determining that a puff is occurring or imminent.

As discussed herein, the vaporizer device 100 consistent with implementations of the current subject matter can be configured to connect (such as, for example, wirelessly or via a wired connection) to a computing device (or optionally two or more devices) in communication with the vaporizer device 100. To this end, the controller 104 can include communication hardware 105. The controller 104 can also include a memory 108. The communication hardware 105 can include firmware and/or can be controlled by software for executing one or more cryptographic protocols for the communication.

A computing device can be a component of a vaporizer system that also includes the vaporizer device 100, and can include its own hardware for communication, which can establish a wireless communication channel with the communication hardware 105 of the vaporizer device 100. For example, a computing device used as part of a vaporizer system can include a general-purpose computing device (such as a smartphone, a tablet, a personal computer, some other portable device such as a smartwatch, or the like) that executes software to produce a user interface for enabling a user to interact with the vaporizer device 100. In other implementations of the current subject matter, such a device used as part of a vaporizer system can be a dedicated piece of hardware such as a remote control or other wireless or wired device having one or more physical or soft (i.e., configurable on a screen or other display device and selectable via user interaction with a touch-sensitive screen or some other input device like a mouse, pointer, trackball, cursor buttons, or the like) interface controls. The vaporizer device 100 can also include one or more outputs 117 or devices for providing information to the user. For example, the outputs 117 can include one or more light emitting diodes (LEDs) configured to provide feedback to a user based on a status and/or mode of operation of the vaporizer device 100.

In the example in which a computing device provides signals related to activation of the resistive heating element, or in other examples of coupling of a computing device with the vaporizer device 100 for implementation of various control or other functions, the computing device executes one or more computer instruction sets to provide a user interface and underlying data handling. In one example, detection by the computing device of user interaction with one or more user interface elements can cause the computing device to signal the vaporizer device 100 to activate the heating element to reach an operating temperature for creation of an inhalable dose of vapor/aerosol. Other functions of the vaporizer device 100 can be controlled by interaction of a user with a user interface on a computing device in communication with the vaporizer device 100.

The temperature of a resistive heating element of the vaporizer device 100 can depend on a number of factors, including an amount of electrical power delivered to the resistive heating element and/or a duty cycle at which the electrical power is delivered, conductive heat transfer to other parts of the electronic vaporizer device 100 and/or to the environment, latent heat losses due to vaporization of the vaporizable material 102 from the wicking element and/or the atomizer 141 as a whole, and convective heat losses due to airflow (i.e., air moving across the heating element or the atomizer 141 as a whole when a user inhales on the vaporizer device 100). As noted herein, to reliably activate the heating element or heat the heating element to a desired temperature, the vaporizer device 100 may, in some implementations of the current subject matter, make use of signals from the sensor 113 (for example, a pressure sensor) to determine when a user is inhaling. The sensor 113 can be positioned in the airflow path and/or can be connected (for example, by a passageway or other path) to an airflow path containing an inlet for air to enter the vaporizer device 100 and an outlet via which the user inhales the resulting vapor and/or aerosol such that the sensor 113 experiences changes (for example, pressure changes) concurrently with air passing through the vaporizer device 100 from the air inlet to the air outlet. In some implementations of the current subject matter, the heating element can be activated in association with a user's puff, for example by automatic detection of the puff, or by the sensor 113 detecting a change (such as a pressure change) in the airflow path.

The sensor 113 can be positioned on or coupled to (i.e., electrically or electronically connected, either physically or via a wireless connection) the controller 104 (for example, a printed circuit board assembly or other type of circuit board). To take measurements accurately and maintain durability of the vaporizer device 100, it can be beneficial to provide a seal 127 resilient enough to separate an airflow path from other parts of the vaporizer device 100. The seal 127, which can be a gasket, can be configured to at least partially surround the sensor 113 such that connections of the sensor 113 to the internal circuitry of the vaporizer device 100 are separated from a part of the sensor 113 exposed to the airflow path. In an example of a cartridge-based vaporizer, the seal 127 can also separate parts of one or more electrical connections between the vaporizer body 110 and the vaporizer cartridge 120. Such arrangements of the seal 127 in the vaporizer device 100 can be helpful in mitigating against potentially disruptive impacts on vaporizer components resulting from interactions with environmental factors such as water in the vapor or liquid phases, other fluids such as the vaporizable material 102, etc., and/or to reduce the escape of air from the designated airflow path in the vaporizer device 100. Unwanted air, liquid or other fluid passing and/or contacting circuitry of the vaporizer device 100 can cause various unwanted effects, such as altered pressure readings, and/or can result in the buildup of unwanted material, such as moisture, excess vaporizable material 102, etc., in parts of the vaporizer device 100 where they can result in poor pressure signal, degradation of the sensor 113 or other components, and/or a shorter life of the vaporizer device 100. Leaks in the seal 127 can also result in a user inhaling air that has passed over parts of the vaporizer device 100 containing, or constructed of, materials that may not be desirable to be inhaled.

In some implementations, the vaporizer body 110 includes the controller 104, the power source 112 (for example, a battery), one more of the sensor 113, charging contacts (such as those for charging the power source 112), the seal 127, and a cartridge receptacle 118 configured to receive the vaporizer cartridge 120 for coupling with the vaporizer body 110 through one or more of a variety of attachment structures. In some examples, the vaporizer cartridge 120 includes the reservoir 140 for containing the vaporizable material 102, and the mouthpiece 130 has an aerosol outlet for delivering an inhalable dose to a user. The vaporizer cartridge 120 can include the atomizer 141 having a wicking element and a heating element. Alternatively, one or both of the wicking element and the heating element can be part of the vaporizer body 110. In implementations in which any part of the atomizer 141 (i.e., heating element and/or wicking element) is part of the vaporizer body 110, the vaporizer device 100 can be configured to supply vaporizable material 102 from the reservoir 140 in the vaporizer cartridge 120 to the part(s) of the atomizer 141 included in the vaporizer body 110.

Cartridge-based configurations for the vaporizer device 100 that generate an inhalable dose of a vaporizable material 102 that is not a liquid, via heating of a non-liquid material, are also within the scope of the current subject matter. For example, the vaporizer cartridge 120 can include a mass of a plant material that is processed and formed to have direct contact with parts of one or more resistive heating elements, and the vaporizer cartridge 120 can be configured to be coupled mechanically and/or electrically to the vaporizer body 110 that includes the controller 104, the power source 112, and one or more receptacle contacts 125*a* and 125*b* configured to connect to one or more corresponding cartridge contacts 124*a* and 124*b* and complete a circuit with the one or more resistive heating elements.

In an embodiment of the vaporizer device 100 in which the power source 112 is part of the vaporizer body 110, and a heating element is disposed in the vaporizer cartridge 120 and configured to couple with the vaporizer body 110, the vaporizer device 100 can include electrical connection features (for example, means for completing a circuit) for completing a circuit that includes the controller 104 (for example, a printed circuit board, a microcontroller, or the like), the power source 112, and the heating element (for example, a heating element within the atomizer 141). These features can include one or more contacts (referred to herein as cartridge contacts 124*a* and 124*b*) on a bottom surface of the vaporizer cartridge 120 and at least two contacts (referred to herein as receptacle contacts 125*a* and 125*b*) disposed near a base of the cartridge receptacle 118 of the vaporizer device 100 such that the cartridge contacts 124*a* and 124*b* and the receptacle contacts 125*a* and 125*b* make electrical connections when the vaporizer cartridge 120 is inserted into and coupled with the cartridge receptacle 118. The circuit completed by these electrical connections can allow delivery of electrical current to a heating element and can further be used for additional functions, such as measuring a resistance of the heating element for use in determining and/or controlling a temperature of the heating element based on a thermal coefficient of resistivity of the heating element.

In some implementations of the current subject matter, the cartridge contacts 124*a* and 124*b* and the receptacle contacts 125*a* and 125*b* can be configured to electrically connect in either of at least two orientations. In other words, one or more circuits necessary for operation of the vaporizer device 100 can be completed by insertion of the vaporizer cartridge 120 into the cartridge receptacle 118 in a first rotational orientation (around an axis along which the vaporizer cartridge 120 is inserted into the cartridge receptacle 118 of the vaporizer body 110) such that the cartridge contact 124*a* is electrically connected to the receptacle contact 125*a* and the cartridge contact 124*b* is electrically connected to the receptacle contact 125*b*. Furthermore, the one or more circuits necessary for operation of the vaporizer device 100 can be completed by insertion of the vaporizer cartridge 120 in the cartridge receptacle 118 in a second rotational orientation such cartridge contact 124*a* is electrically connected to the receptacle contact 125*b* and cartridge contact 124*b* is electrically connected to the receptacle contact 125*a*.

In one example of an attachment structure for coupling the vaporizer cartridge 120 to the vaporizer body 110, the vaporizer body 110 includes one or more detents (for example, dimples, protrusions, etc.) protruding inwardly from an inner surface of the cartridge receptacle 118, additional material (such as metal, plastic, etc.) formed to include a portion protruding into the cartridge receptacle 118, and/or the like. One or more exterior surfaces of the vaporizer cartridge 120 can include corresponding recesses (not shown in FIG. 1A) that can fit and/or otherwise snap over such detents or protruding portions when the vaporizer cartridge 120 is inserted into the cartridge receptacle 118 on the vaporizer body 110. When the vaporizer cartridge 120 and the vaporizer body 110 are coupled (e.g., by insertion of the vaporizer cartridge 120 into the cartridge receptacle 118 of the vaporizer body 110), the detents or protrusions of the vaporizer body 110 can fit within and/or otherwise be held within the recesses of the vaporizer cartridge 120, to hold the vaporizer cartridge 120 in place when assembled. Such an assembly can provide enough support to hold the vaporizer cartridge 120 in place to ensure good contact between the cartridge contacts 124*a* and 124*b* and the receptacle contacts 125*a* and 125*b*, while allowing release of the vaporizer cartridge 120 from the vaporizer body 110 when a user pulls with reasonable force on the vaporizer cartridge 120 to disengage the vaporizer cartridge 120 from the cartridge receptacle 118.

In some implementations, the vaporizer cartridge 120, or at least an insertable end 122 of the vaporizer cartridge 120 configured for insertion in the cartridge receptacle 118, can have a non-circular cross section transverse to the axis along which the vaporizer cartridge 120 is inserted into the cartridge receptacle 118. For example, the non-circular cross section can be approximately rectangular, approximately elliptical (i.e., have an approximately oval shape), non-rectangular but with two sets of parallel or approximately parallel opposing sides (i.e., having a parallelogram-like shape), or other shapes having rotational symmetry of at least order two. In this context, approximate shape indicates that a basic likeness to the described shape is apparent, but that sides of the shape in question need not be completely linear and vertices need not be completely sharp. Rounding of both or either of the edges or the vertices of the cross-sectional shape is contemplated in the description of any non-circular cross section referred to herein.

The cartridge contacts 124*a* and 124*b* and the receptacle contacts 125*a* and 125*b* can take various forms. For example, one or both sets of contacts can include conductive pins, tabs, posts, receiving holes for pins or posts, or the like. Some types of contacts can include springs or other features to facilitate better physical and electrical contact between the contacts on the vaporizer cartridge 120 and the vaporizer body 110. The electrical contacts can optionally be gold-plated, and/or include other materials.

Figure 1B:
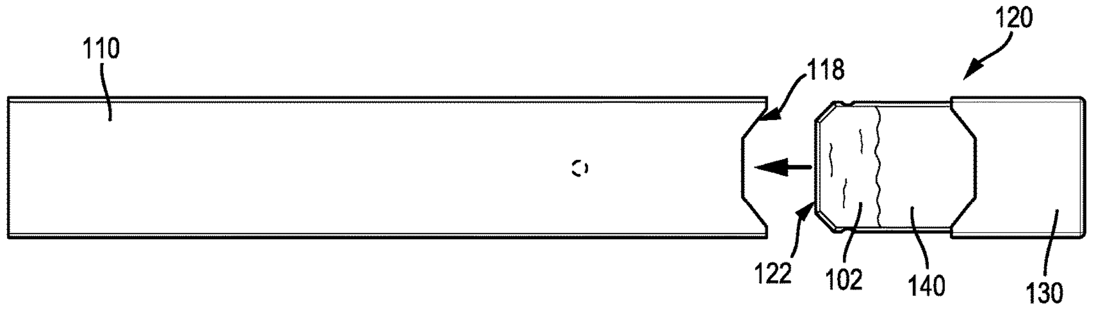
FIG. 1B is a schematic representation of a vaporizer device and vaporizer cartridge.

FIG. 1B illustrates an embodiment of the vaporizer body 110 and the cartridge receptacle 118 into which the vaporizer cartridge 120 can be releasably inserted. FIG. 1B shows a top view of the vaporizer device 100 illustrating the vaporizer cartridge 120 positioned for insertion into the vaporizer body 110. When a user puffs on the vaporizer device 100, air can pass between an outer surface of the vaporizer cartridge 120 and an inner surface of the cartridge receptacle 118 on the vaporizer body 110. Air can then be drawn into the insertable end 122 of the cartridge, through the vaporization chamber that includes or contains the heating element and wick, and out through an outlet of the mouthpiece 130 for delivery of the inhalable aerosol to a user. The reservoir 140 of the vaporizer cartridge 120 can be formed in whole or in part from translucent material such that a level of the vaporizable material 102 is visible within the vaporizer cartridge 120. The mouthpiece 130 can be a separable component of the vaporizer cartridge 120 or can be integrally formed with other component(s) of the vaporizer cartridge 120 (for example, formed as a unitary structure with the reservoir 140 and/or the like).

Further to the discussion above regarding the electrical connections between the vaporizer cartridge 120 and the vaporizer body 110 being reversible such that at least two rotational orientations of the vaporizer cartridge 120 in the cartridge receptacle 118 are possible, in some embodiments of the vaporizer device 100, the shape of the vaporizer cartridge 120, or at least a shape of the insertable end 122 of the vaporizer cartridge 120 that is configured for insertion into the cartridge receptacle 118, can have rotational symmetry of at least order two. In other words, the vaporizer cartridge 120 or at least the insertable end 122 of the vaporizer cartridge 120 can be symmetrical upon a rotation of 180° around an axis along which the vaporizer cartridge 120 is inserted into the cartridge receptacle 118. In such a configuration, the circuitry of the vaporizer device 100 can support identical operation regardless of which symmetrical orientation of the vaporizer cartridge 120 occurs.

Figure 1C:
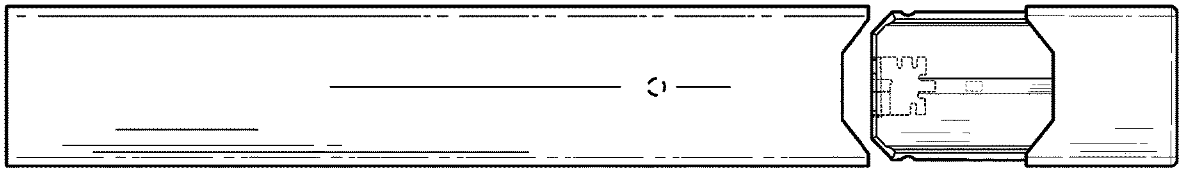
FIG. 1C is a front view of a vaporizer device and an embodiment of a vaporizer cartridge.
Figure 1D:
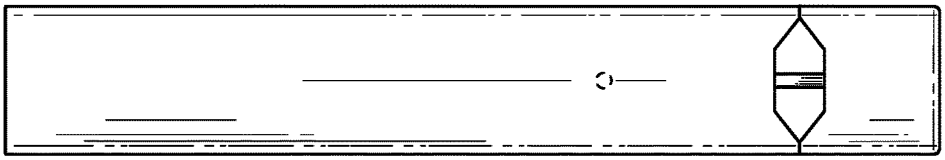
FIG. 1D is a front view of a vaporizer cartridge coupled to a vaporizer device.

FIGS. 1C-1D illustrate example features that can be included in embodiments of the vaporizer device 100 consistent with implementations of the current subject matter. FIGS. 1C and 1D show top views of an example of the vaporizer device 100 before (FIG. 1C) and after (FIG. 1D) connecting the vaporizer cartridge 120 to the vaporizer body 110.

Figure 1E:
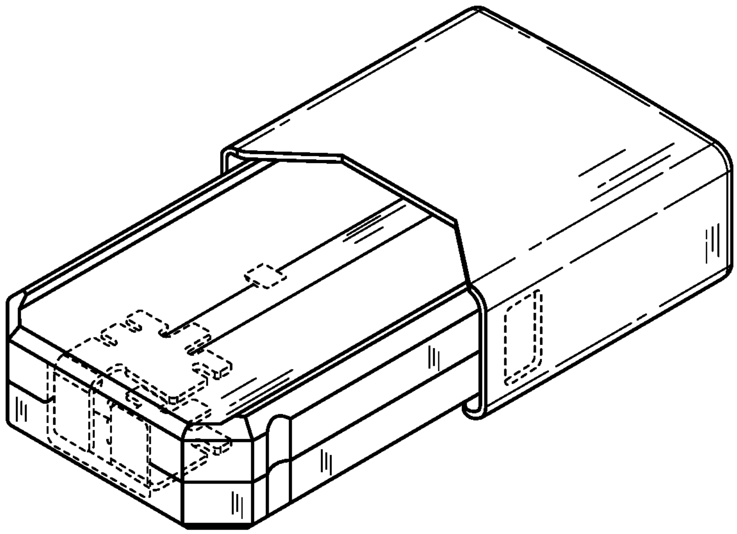
FIG. 1E is a perspective view of a vaporizer cartridge.

FIG. 1E illustrates a perspective view of one variation of the vaporizer cartridge 120 holding the vaporizable material 102. Any appropriate vaporizable material 102 can be contained within the vaporizer cartridge 120 (for example, within the reservoir 140), including solutions of nicotine or other organic materials.

Figure 1F:
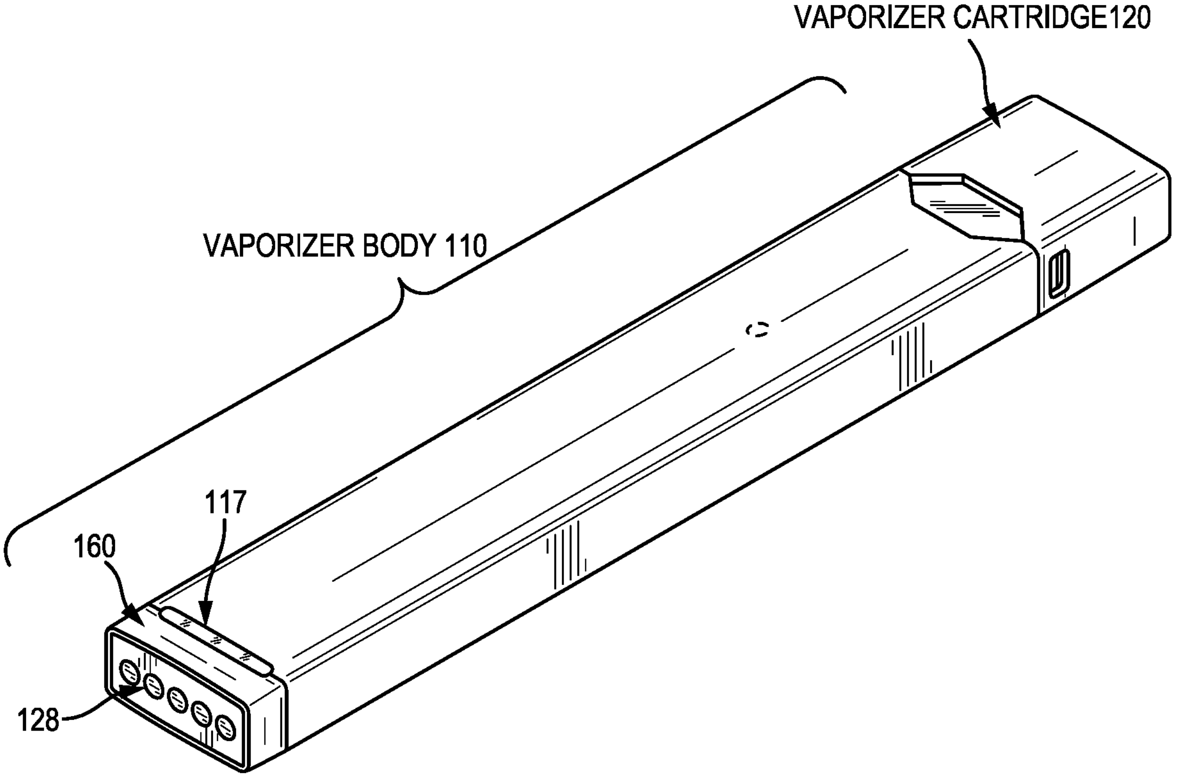
FIG. 1F is a perspective view of another embodiment of a vaporizer cartridge coupled to a vaporizer device.

FIG. 1F shows a perspective view of another example of a vaporizer device 100 including a vaporizer body 110 coupled to a separable vaporizer cartridge 120. As illustrated, the vaporizer device 100 can include one or more outputs 117 (for example, LEDs) configured to provide information to a user based on a status, mode of operation, and/or the like, of the vaporizer device 100. In some aspects, the one or more outputs 117 can include a plurality of LEDs (i.e., two, three, four, five, or six LEDs). The one or more outputs 117 (i.e., each individual LED) can be configured to display light in one or more colors (for example, white, red, blue, green, yellow, etc.). The one or more outputs 117 can be configured to display different light patterns (for example, by illuminating specific LEDs, varying a light intensity of one or more of the LEDs over time, illuminating one or more LEDs with a different color, and/or the like) to indicate different statuses, modes of operation, and/or the like of the vaporizer device 100. In some implementations, the one or more outputs 117 can be proximal to and/or at least partially disposed within a bottom end region 160 of the vaporizer device 100. The vaporizer device 100 may, additionally or alternatively, include externally accessible charging contacts 128, which can be proximate to and/or at least partially disposed within the bottom end region 160 of the vaporizer device 100.

Figure 2A:
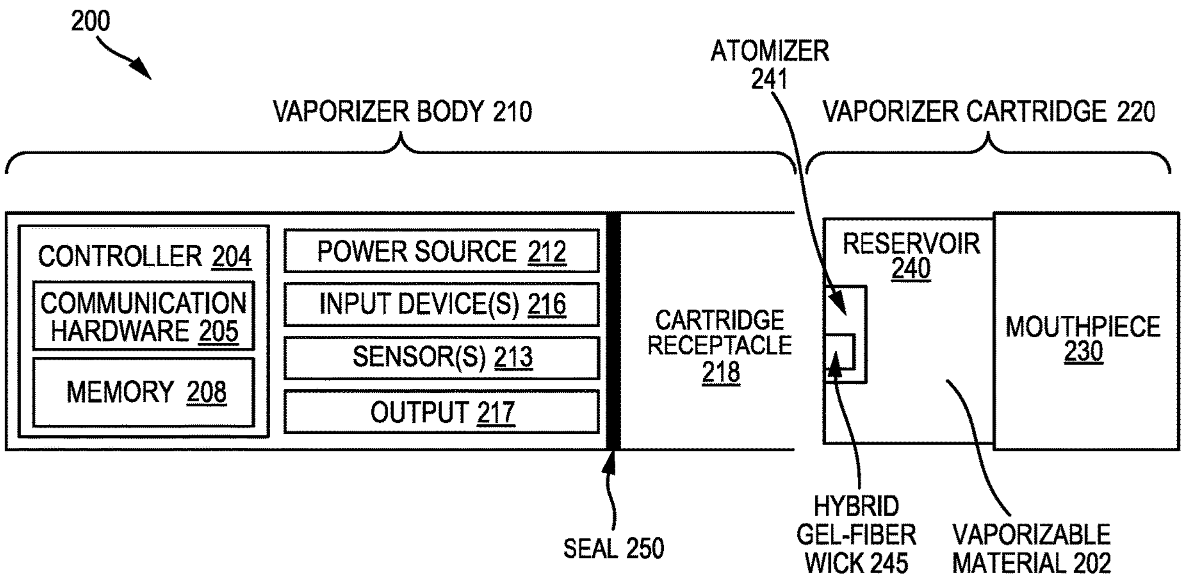
FIG. 2A is a block diagram of an embodiment of a vaporizer device, according to implementations of the present disclosure.

Referring to the block diagram of FIG. 2A, a vaporizer device 200 can include an atomizer 241 configured to cause a vaporizable material 202 to be converted from a condensed form (such as a solid, a liquid, a solution, a suspension, a part of an at least partially unprocessed plant material, etc.) to the gas phase. The atomizer 241 in the vaporizer device 200 can be configured to include a hybrid gel-fiber wick 260. The atomizer 241 can include a hybrid gel-fiber wick 260 (i.e., a wick) configured to convey an amount of the vaporizable material 202 to a part of the atomizer 241 that includes a heating element 242 (not shown in FIG. 2A).

For example, the hybrid gel-fiber wick 260 can be configured to draw the vaporizable material 202 from a reservoir 240 configured to contain the vaporizable material 202, such that the vaporizable material 202 can be vaporized by heat delivered from a heating element 242. In some embodiments of the current subject matter, capillary action, diffusion, and attractive intermolecular forces can pull vaporizable material 202 into the hybrid gel-fiber wick 260 for vaporization by the heating element 242, and air can return to the reservoir 240 to at least partially equalize pressure in the reservoir 240. Various methods of allowing air back into the reservoir 240 to equalize pressure are within the scope of the current subject matter.

The heating element 242 can include one or more of a conductive heater, a radiative heater, and/or a convective heater. One type of heating element 242 is a resistive heating element 242, which can include a material (such as a metal or alloy, for example a nickel-chromium alloy, or a non-metallic resistor) configured to dissipate electrical power in the form of heat when electrical current is passed through one or more resistive segments of the heating element 242. In implementations of the current subject matter, the atomizer 241 can include a heating element 242 which includes a resistive coil or other heat conducting element wrapped around, positioned within, integrated into a bulk shape of, pressed into thermal contact with, or otherwise arranged relative to the gel coating 244 of the hybrid gel-fiber wick 260 to deliver heat to the hybrid gel-fiber wick 260 and cause the vaporizable material 202 drawn from the reservoir 240 by the hybrid gel-fiber wick 260 to be vaporized for subsequent inhalation by a user in a gas and/or a condensed phase (for example, aerosol particles or droplets).

Figure 2B:
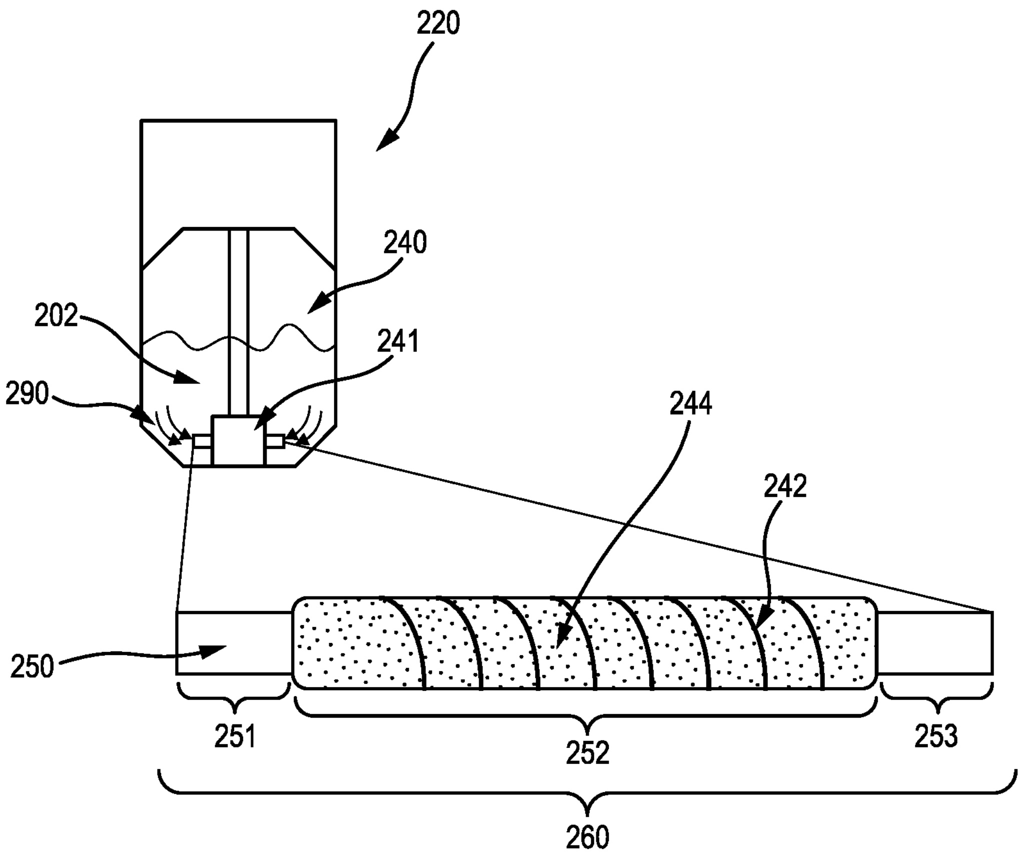
FIG. 2B illustrates an embodiment of a hybrid gel-fiber wick for use in a vaporizer cartridge, according to implementations of the present disclosure.

FIG. 2B illustrates an embodiment of a hybrid gel-fiber wick 260 positioned within the vaporizer cartridge 220 of FIG. 2A. The hybrid gel-fiber wick 260 includes a fiber core 250 and a gel coating 244, each in thermal contact with the heating element 242. The fiber core 250 can include a plurality of fibers bundled together to form a fiber core 250 with the fibers including silica, cotton, or other suitable fibrous materials. The fiber core 250 includes a first end portion 251, a second end portion 253, and a middle portion 252. The gel coating 244 is disposed on the middle portion 252 of the fiber core 250, with first end portion 251 and the second end portion 253 remaining uncoated. When the hybrid gel-fiber wick 260 is disposed in the cartridge 220, the first end portion 251 and the second end portion 253, each not coated with the gel, are located within the reservoir 240. The middle portion 252 coated with gel coating 244 is located within the atomizer 241 of the cartridge 220.

The gel coating 244 can include a silicon-based gel, a polymeric gel, or other suitable gel compositions. In embodiments, the gel comprises silicon. In embodiments, the gel comprises a silane. In embodiments, the gel comprises a silicate. In embodiments, the gel comprises tetraethoxysilane. In embodiments, the gel is an inorganic gel. In embodiments, the gel is an organic gel.

The arrows 290 depicted within the vaporizer cartridge 220 indicate the flow of vaporizable material 202 into the hybrid gel-fiber wick 260. This flow of vaporizable material 202 can be due to a combination of capillary pressure between the fiber core 250 and the gel coating 244 of the hybrid gel-fiber wick 260, diffusion of the vaporizable material 202 through the gel coating 244, and attractive intermolecular forces between the hybrid gel-fiber wick 260 and the vaporizable material 202. This flow of vaporizable material 202 can result in increased and consistent TPM delivery to the user, as compared to a traditional, uncoated wick. As shown in the exploded view of the hybrid gel-fiber wick 260 in FIG. 2B, the first end portion 251 and the second end portion 253 remains uncoated with the gel coating 244, such that the initial contact between the hybrid gel-fiber wick 260 and the vaporizable material 202, and transport out of the reservoir 240 is via capillary action. The concentration gradient between the fiber core 250 of the hybrid gel-fiber wick 260 and the gel coating 244 of the hybrid gel-fiber wick 260 creates a diffusive driving force.

In embodiments, the hybrid gel-fiber wick 260 includes the heating element 242, such as a heating coil, disposed between the fiber core 250 and the gel coating 244 of the hybrid gel-fiber wick 260. In other embodiments, the hybrid gel-fiber wick 260 does not include the heating element 242 disposed between the fiber core 250 and the gel coating 244 of the hybrid gel-fiber wick 260.

Figure 3:
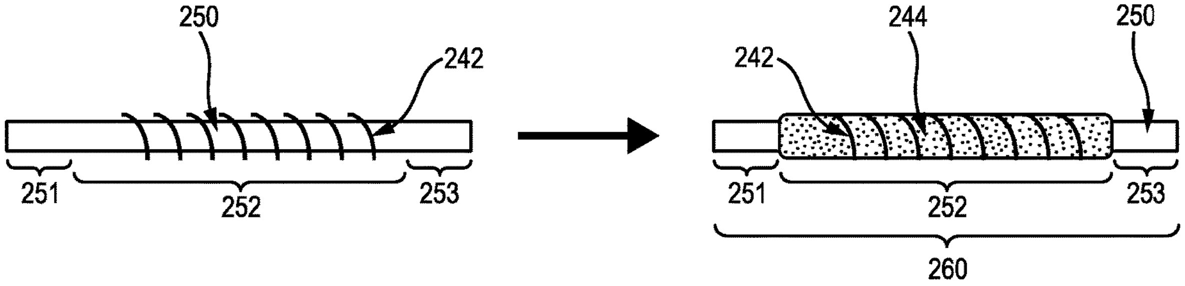
FIG. 3 illustrates a method of preparing the hybrid gel-fiber wick of FIG. 2B, according to implementations of the present disclosure.

FIG. 3 depicts a fiber core 250, comprising a plurality of fibers bundled together, that is wrapped with a heating element 242. Subsequently, a gel coating 244 is disposed on a middle portion 252 to form the hybrid gel-fiber wick 260. The gel coating 244 is in contact with the heating element 242 and the middle portion 252 of the hybrid gel-fiber wick 260. In embodiments, the gel coating 244 coats the heating element 242 and the middle portion 252 to a thickness of about 500 microns. The thickness of the gel coating 244 may vary without departing from the scope of this disclosure. In embodiments, the gel coating 244 is applied by dispensing the gel directly onto the fiber core 250 using a needle, for example by using a syringe. In embodiments, the gel coating 244 is applied by printing the gel directly onto the fiber core 250 using a printer, for example by using a 3D printer. In embodiments, the gel coating 244 is applied by molding the gel directly onto the fiber core 250 using a mold. In other embodiments, the gel coating 244 is applied to the hybrid gel-fiber wick 260 prior to wrapping the heating element 242 around the hybrid gel-fiber wick 260, and prior to inserting the hybrid gel-fiber wick 260 into the vaporizer cartridge 220.

The mechanism for generating aerosol within the vaporizer cartridge 220 includes heating the coil of the heating element 242, which in turn heats the gel coating 244 of the hybrid gel-fiber wick 260 that has been saturated with vaporizable material 202. The gel coating 244 generates aerosol at a lower temperature to reduce any generation of harmful and potentially harmful chemicals (HPHCs). The gel coating 244 also provides thermal stability that can also enhance the thermal transfer of heat from the heating element 242 to the hybrid gel-fiber wick 260, which reinforces the ability of the hybrid gel-fiber wick 260 to maintain consistent TPM delivery across all vaporizer cartridges 220 manufactured with a hybrid gel-fiber wick 260.

Using a hybrid gel-fiber wick 260 in a vaporizer device 200 can resolve the variability in TPM delivery between vaporizer cartridges 220 that typically occurs when using a traditional wick. The hybrid gel-fiber wick 260 can enhance the replenish rate of vaporizable material 202 into the hybrid gel-fiber wick 260 and the vaporizable material 202 capacity of the hybrid gel-fiber wick 260, thereby eliminating the inconsistencies in average amount of aerosol delivered to the user per puff, and increasing the average amount of aerosol generated each time the vaporizer device 200 is puffed. As a result of these benefits, the temperature of the heating element 242 may be lowered thereby reducing power consumption and reducing the generation of any HPHCs.

It has been observed that a positive relationship exists between the tightness of a heating coil wrapped around a wicking element, and the resulting TPM generated during operation. This positive relationship is due to the fact that an increased contact area between the wicking element and the heating coil increases the thermal energy transfer. Therefore, variations in the tightness of the heating coil around the wicking element can create variations in TPM delivered. By utilizing a hybrid gel-fiber wick, the variations in TPM delivery can be reduced due to the gel coating 244 of the hybrid gel-fiber wick, which is in contact with the heating element and has the inherent ability to swell and thereby maximize the surface area in contact with the heating element. This can establish consistent TPM delivery across all vaporizer cartridges manufactured with a hybrid gel-fiber wick, and can also increase TPM delivered to the user per puff.

The hybrid gel-fiber wick has the capability to increase the replenish rate of vaporizable material into the hybrid gel-fiber wick and ultimately bring consistency to the aerosol delivered to the user over consecutive puffs. The primary driving force of saturation of a traditional wick is via capillary action, wherein the vaporizable material is able to flow through the wick's matrices by exhibiting an affinity towards its composition. However, due to the viscous nature of the vaporizable material, capillary action alone may not replenish the wick fast enough to maintain consistent TPM delivery across consecutive puffs, and an initial spike in TPM may occur at the initial puff due to the fully saturated wick. A prolonged time interval may be necessary for a traditional wick to become fully saturated again, and the negative headspace pressure created within the vaporizer cartridge by consecutive puffs may further reduce the traditional wick's capillary pressure and decrease its ability to replenish efficiently. The hybrid gel-fiber wick can decrease the replenish rate by introducing diffusion mechanisms across the fiber core and the gel coating of the hybrid gel-fiber wick, thereby creating more resistance to negative headspace pressure within the reservoir of the vaporizer cartridge.

Figure 4:
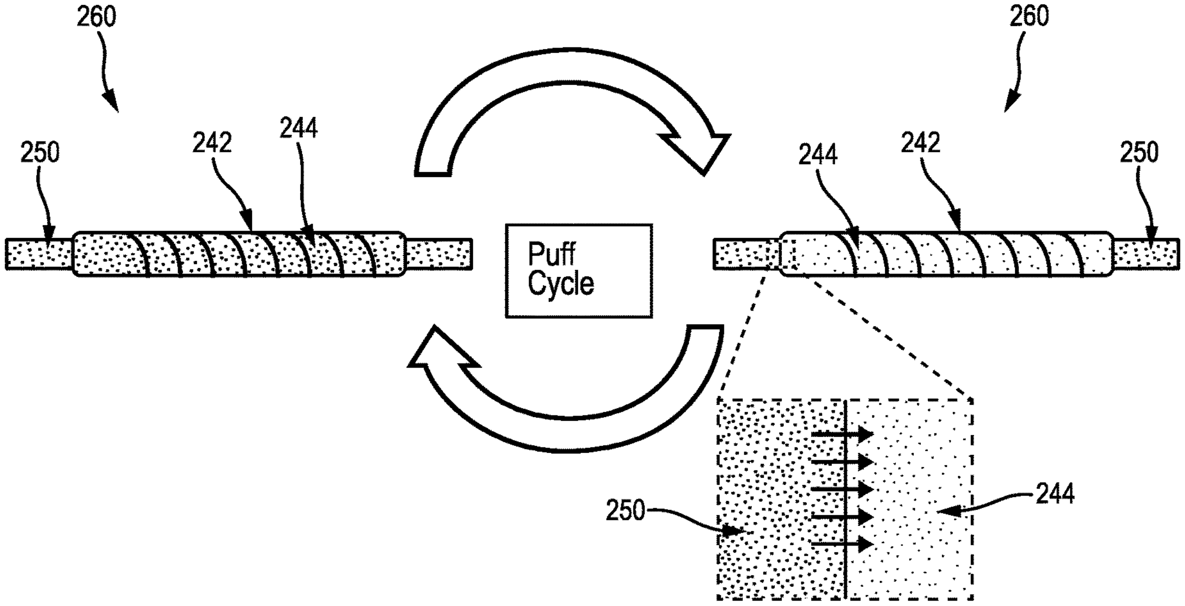
FIG. 4 illustrates a puff and replenish cycle of the hybrid gel-fiber wick of FIG. 2B, according to implementations of the present disclosure.

FIG. 4 illustrates a puff cycle of a hybrid gel-fiber wick 260. At the beginning of a puff (left side), the gel coating 244 and the fiber core 250 of the hybrid gel-fiber wick 260 are saturated with a vaporizable material. After the user has puffed (right side), the gel coating 244 is no longer fully saturated with vaporizable material. The exploded view of the interface between the fiber core 250 and the gel coating 244 after the user has puffed illustrates the transport of vaporizable material from the fiber core into the gel coating 244, thereby saturating the gel coating 244 and readying the hybrid gel-fiber wick 260 for the next puff cycle. Due to a difference in concentration of vaporizable material between the fiber core 250 and the gel coating 244 after a puff, the hybrid gel-fiber wick 260 can draw vaporizable material from a reservoir until an equilibrium is established between the fiber core 250 and the gel coating 244. The smaller pore size of the gel coating 244 relative to the fiber core 250 can also significantly increase the holding capacity of the hybrid gel-fiber wick 260, compared to that of a traditional fiber wick. Additionally, combining the ability of the gel coating 244 of the hybrid gel-fiber wick 260 to swell with the creation of a formulation for the gel coating 244 that exhibits an affinity to the constituents of the vaporizable material creates attracting intermolecular forces between the vaporizable material and the hybrid gel-fiber wick 260, thereby increasing the average TPM delivered per puff. These additional driving forces introduced by the hybrid gel-fiber wick

260 can improve the kinetics of the vaporizable material when it is within the hybrid gel-fiber wick 260, thus increasing the replenish rate and holding capacity and ensuring that the user will experience consistent, increased aerosol delivery over the course of a use session.

Example 1: Tetraethoxysilane Gel Preparation Protocol

The purpose of this protocol is to prepare a tetraethoxysilane (TEOS) e-liquid based gel, and also to prepare a tetraethoxysilane 5% nicotine gel without propylene glycol or a glycerol.

The following materials were used: tetraethoxysilane (CAS #78-10-4), nicotine (CAS #54-11-5), benzoic acid crystals (CAS #65-85-0), ethanol (CAS #64-17-5), hydrochloric acid (1.0 M, CAS #7647-01-0), deionized water (CAS #7732-18-5), Virginia tobacco (5% nicotine) e-liquid, scintillation vial and cap, stir bar, hot plate, spatula, analytical balance, and a sonication bath.

For the benzoic acid solution preparation, 5 mL of liquid nicotine was heated with a stir bar in a 20 mL scintillation vial at 80 degrees Celsius. 3.8 mg of benzoic acid crystals were added to the scintillation vial. The stir bar was set to stir at 500 RPM and the solution was allowed to mix for one hour until all benzoic crystals had completely dissolved. The solution was cooled before use.

For preparation of a 30% by volume tetraethoxysilane (TEOS) formulation, 3 mL of TEOS was added to a 20 mL scintillation vial. 3 mL ethanol was added into the vial. The solution was mixed thoroughly. 4 mL of water were slowly added into the vial, mixing thoroughly as more water was added. Once the mixture was homogenously mixed, 100 μL of benzoic acid solution (1.0 M) and 100 μL of HCl (1.0 M) were slowly added dropwise, stirring the solution between drop additions. The solution was heated at 60° C. on a hot plate with a stir bar at 500 RPM for 2 hours. The solution was allowed to cool before using.

For preparation of a 7.5% by volume TEOS formulation, 0.7 mL of TEOS was added into a 20 mL scintillation vial. 4 mL ethanol was added into the vial. The solution was mixed thoroughly. Slowly, 5.3 mL of water was added into the vial, mixing thoroughly as more water was added. Once the mixture was homogenously mixed, 100 μL of benzoic acid solution (1.0 M) and 100 μL of HCl (1.0 M) were slowly added (dropwise), stirring the solution between drop additions. The solution was heated at 60° C. on a hot plate with a stir bar at 500 RPM for 2 hours and allowed to cool before using.

For preparation of a TEOS e-liquid gel, 7.5 mL of Virginia tobacco (5% nicotine) e-liquid was added into a 20 mL scintillation vial. 2.5 mL of 30% by volume TEOS formulation (prepared as described previously) was added into the vial. It was ensured that the formulation was at room temperature. The solution was mixed thoroughly until homogenous. The scintillation vial was capped and the solution was allowed to crosslink overnight.

For preparation of a TEOS 5% nicotine gel, 9.5 mL of 7.5% by volume TEOS Formulation (prepared as described previously) was added into a 20 mL scintillation vial. It was ensured that the formulation was at room temperature. 0.5 mL of benzoic acid solution (prepared as described previously) was added into the vial. The solution was mixed thoroughly until homogenous. The scintillation vial was capped and the solution was allowed to crosslink overnight.

Example 2: Wick Coating Optimization

To ensure maximum functionality of a hybrid gel-fiber wick, various viscosities of the gel portion of the hybrid gel-fiber wick were tested. The gel portion comprises TEOS, and in order to increase the viscosity of the gel portion, various TEOS solutions were prepared by adding varying amounts of 50:50 propylene glycol/vegetable glycerin (PG/VG.) Increased viscosity, along with precise application of the gel portion to the fiber portion of the hybrid gel-fiber wick using a precise 10 uL syringe, enabled more precise control over the application of the TEOS gel solution. Along with varying viscosity, different volumes of gel to be applied to the hybrid gel-fiber wick were tested to see if there was an effect on TPM. Table 1 below shows a matrix of TEOS/PG:VG formulations tested.

TABLE 1

TEOS/PG:VG Formulations Matrices

| Increasing Injection Volume ↓ / Increasing Viscosity → | 1:1 TEOS/50% PG/VG | 1:3 TEOS/50% PG/VG | 1:5 TEOS/50% PG/VG |
|---|---|---|---|
| 1 uL | 500 mL TEOS<br>500 mL 50:50 PG/VG<br>volume: 1 uL | 500 mL TEOS<br>1500 mL 50:50 PG/VG<br>volume: 1 uL | 500 mL TEOS<br>2500 mL 50:50 PG/VG<br>volume: 1 uL |
| 3 uL | 500 mL TEOS<br>500 mL 50:50 PG/VG<br>volume: 3 uL | 500 mL TEOS<br>1500 mL 50:50 PG/VG<br>volume: 3 uL | 500 mL TEOS<br>2500 mL 50:50 PG/VG<br>volume: 3 uL |
| 5 uL | 500 mL TEOS<br>500 mL 50:50 PG/VG<br>volume: 5 uL | 500 mL TEOS<br>1500 mL 50:50 PG/VG<br>volume: 5 uL | 500 mL TEOS<br>2500 mL 50:50 PG/VG<br>volume: 5 uL |

To establish a baseline, or control, TPM measurement, a traditional wick was utilized. The instrument used was the Puffmaster 3000, and Table 2 below shows the instrument parameters.

TABLE 2

Puffmaster 3000 Parameters
Instrument Parameters

| | |
|---|---|
| Instrument | Puffmaster 3000 |
| Puff Volume | 70 cc |
| Puff Duration | 3 seconds |
| Puff Interval | 30 seconds |

The Puffmaster 3000 has eight channels, therefore the wicks with 1 uL TEOS gel solution applied for wick modification were omitted from testing. Qualitatively, 1 uL injection volume did not appear to coat the fiber core as thoroughly as 3 uL or 5 uL injection volumes, due to the small amount of gel solution. Table 3 below outlines the solutions tested in each channel of the Puffmaster 3000.

TABLE 3

| Solutions Under Testing | |
|---|---|
| Channel 1 | Control |
| Channel 2 | 3 uL 1:1 TEOS:50% PG/VG |
| Channel 3 | 3 uL 1:3 TEOS:50% PG/VG |
| Channel 4 | 3 uL 1:5 TEOS:50% PG/VG |
| Channel 5 | 5 uL 1:1 TEOS:50% PG/VG |
| Channel 6 | 5 uL 1:3 TEOS:50% PG/VG |
| Channel 7 | 5 uL 1:5 TEOS:50% PG/VG |

Figure 5:
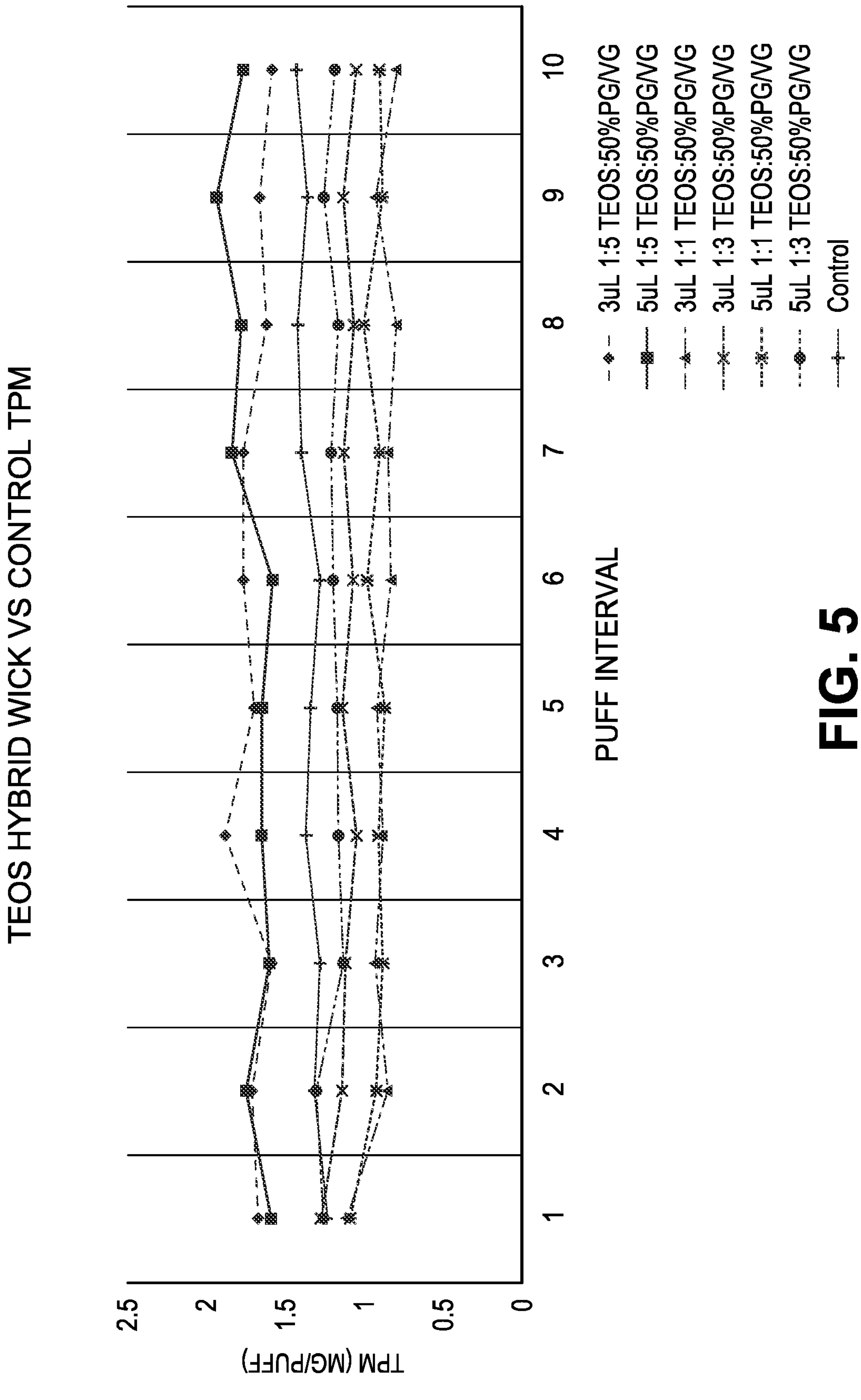
FIG. 5 is a graph of total particulate matter (TPM) as a function of puff interval for a hybrid gel-fiber wick consistent with implementations of the present disclosure.

As shown in FIG. 5, TPM data was collected using the above TEOS solutions. Ten puff intervals were performed, and the TPM delivered per puff interval was calculated by dividing the mass change during puffing by the number of puffs in the puff interval (10). As can be seen in the graph, the 3 uL and 5 uL volumes of 1:5 TEOS:50% PG/VG consistently exhibited higher TPM than that of the control wick, and the 3 uL and 5 uL volumes of 1:3 TEOS:50% PG/VG and 1:1 TEOS:50% PG/VG consistently exhibited lower TPM than that of the control wick. These initial TPM tests show that the injection volume has little to no effect on TPM delivered to the user, however higher viscosity of the TEOS solution appears to increase TPM. The consistent TPM observed among the hybrid gel-fiber wicks suggests that the gel structure is not collapsing during the puffing sequence.

Figure 6:
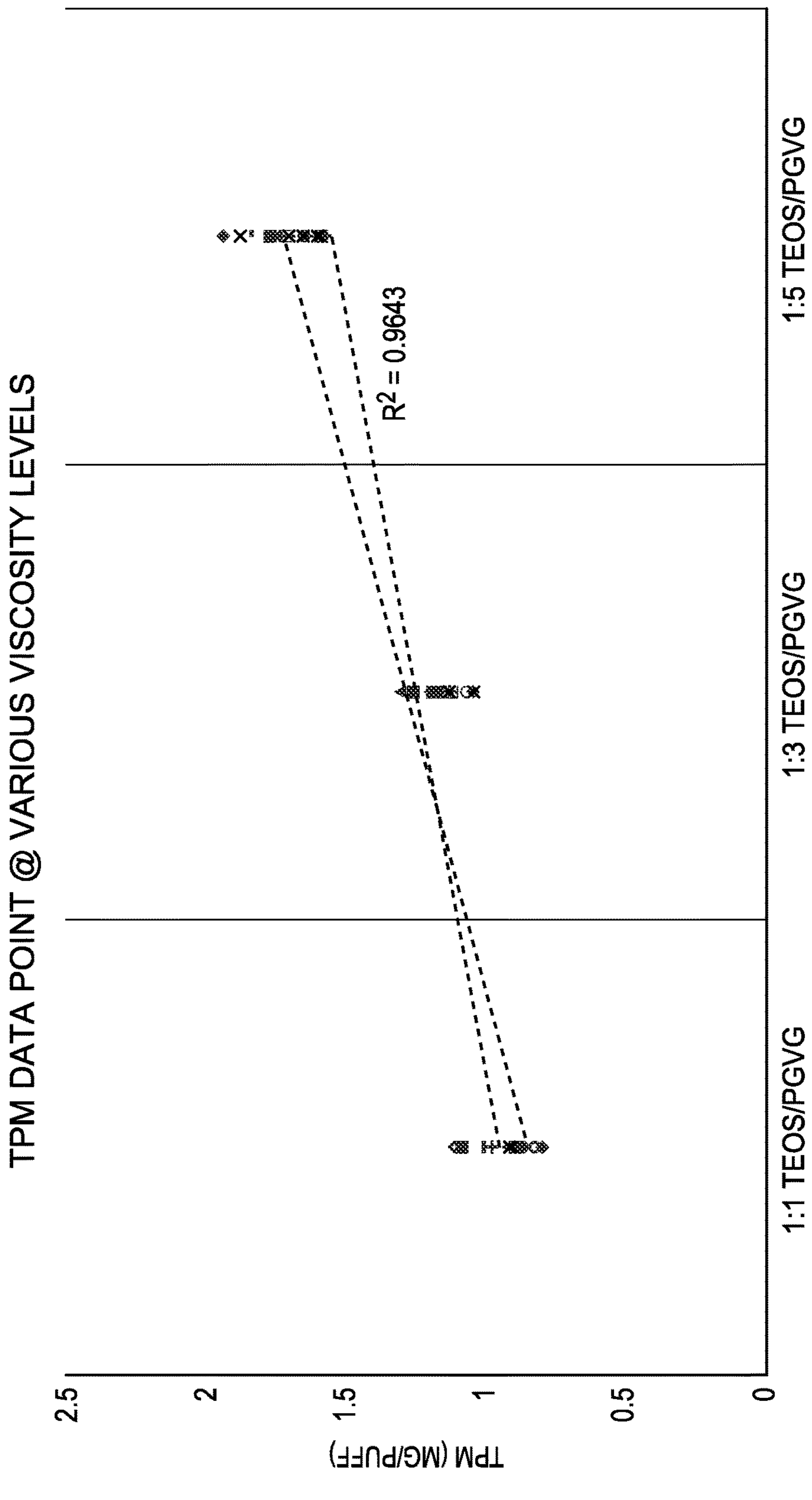
FIG. 6 is a graph of TPM as a function of viscosity for various embodiments of a gel for use in a hybrid gel-fiber wick consistent with implementations of the present disclosure.

As shown in FIG. 6, all TPM data points were plotted for their respective formulations, regardless of the volume of gel solution applied on the wick, in order to further investigate the effect of viscosity on TPM. Trend lines were plotted, and the coefficient of correlation (R) was calculated by taking the square root of the coefficient of determination ($R^2$). With R=0.9798, it was determined that there exists a positive relationship between increased viscosity of TEOS gel solution and increased TPM delivered to the user. Increased viscosity can enable more controlled application of the TEOS gel solution onto the fiber core, as more time is required for the TEOS gel solution to disperse through the matrices of the fiber core.

Figure 7:
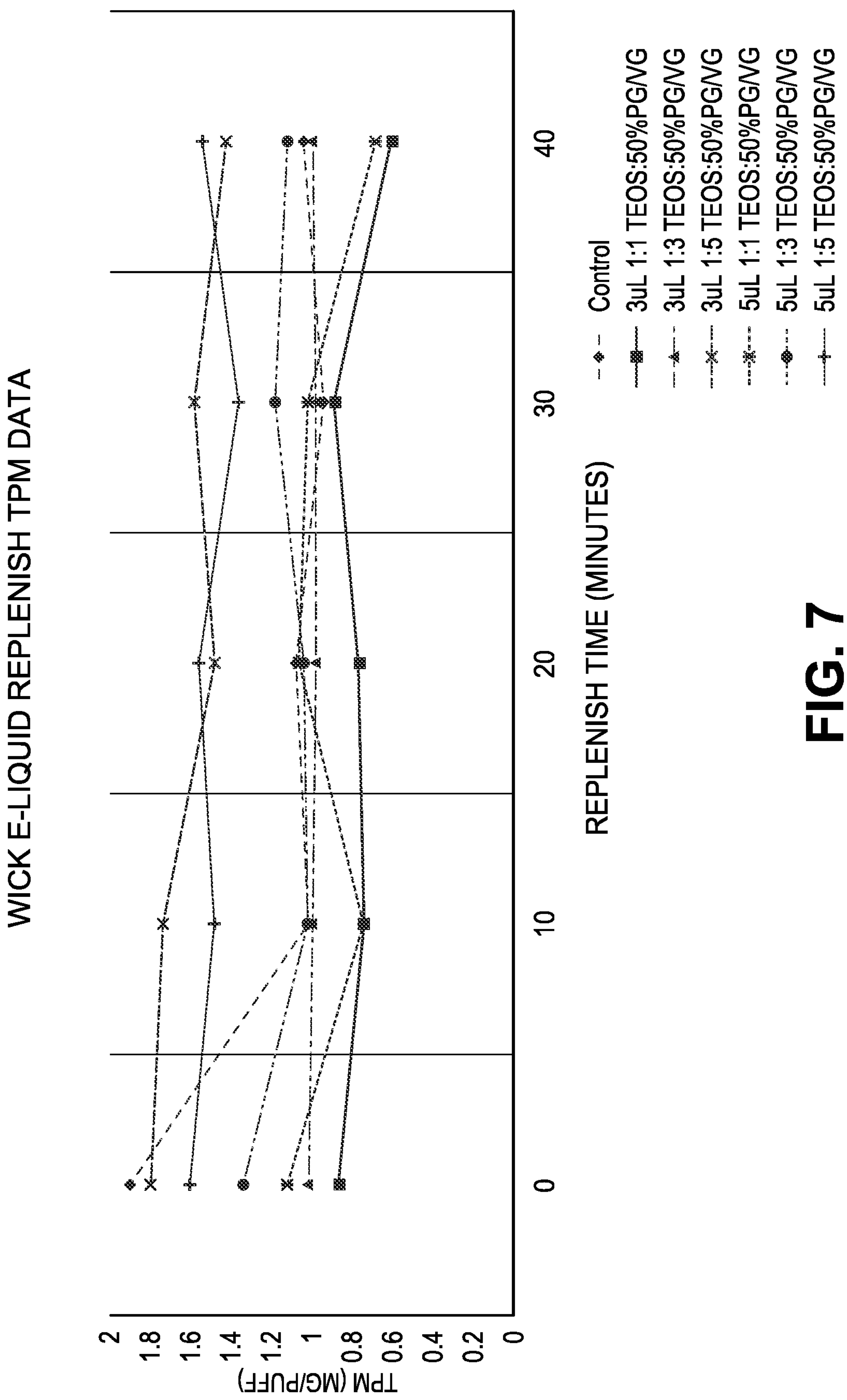
FIG. 7 is a graph of TPM as a function of replenish rate of a hybrid gel-fiber wick consistent with implementations of the present disclosure.

FIG. 7 is a graph of TPM as a function of replenish rate for various TEOS gel solutions. To observe the time required for each hybrid gel-fiber wick to be fully replenished, various TEOS gel solutions and volumes were puffed after various replenish times, starting at 10 minutes and increasing by increments of 10 minutes. This was done to measure the amount of time the user would have to wait between puffing sessions to experience the maximum aerosol output, as the hybrid gel-fiber wick replenishes via capillary action and diffusion mechanisms. As can be seen in FIG. 7, hybrid gel-fiber wicks show better holding capacity for vaporizable material, and better replenish rates, by displaying consistent TPM across all time intervals. The control wick showed an initially high TPM, however it is unable to recover to initial conditions, even with a longer replenish time. Volume appears to have little to no effect on replenish rate. The high viscosity formulation, 1:5 TEOS/50% PG/VG, showed the highest TPM and were relatively consistent through all time points compared to the control wick.

Figure 8:
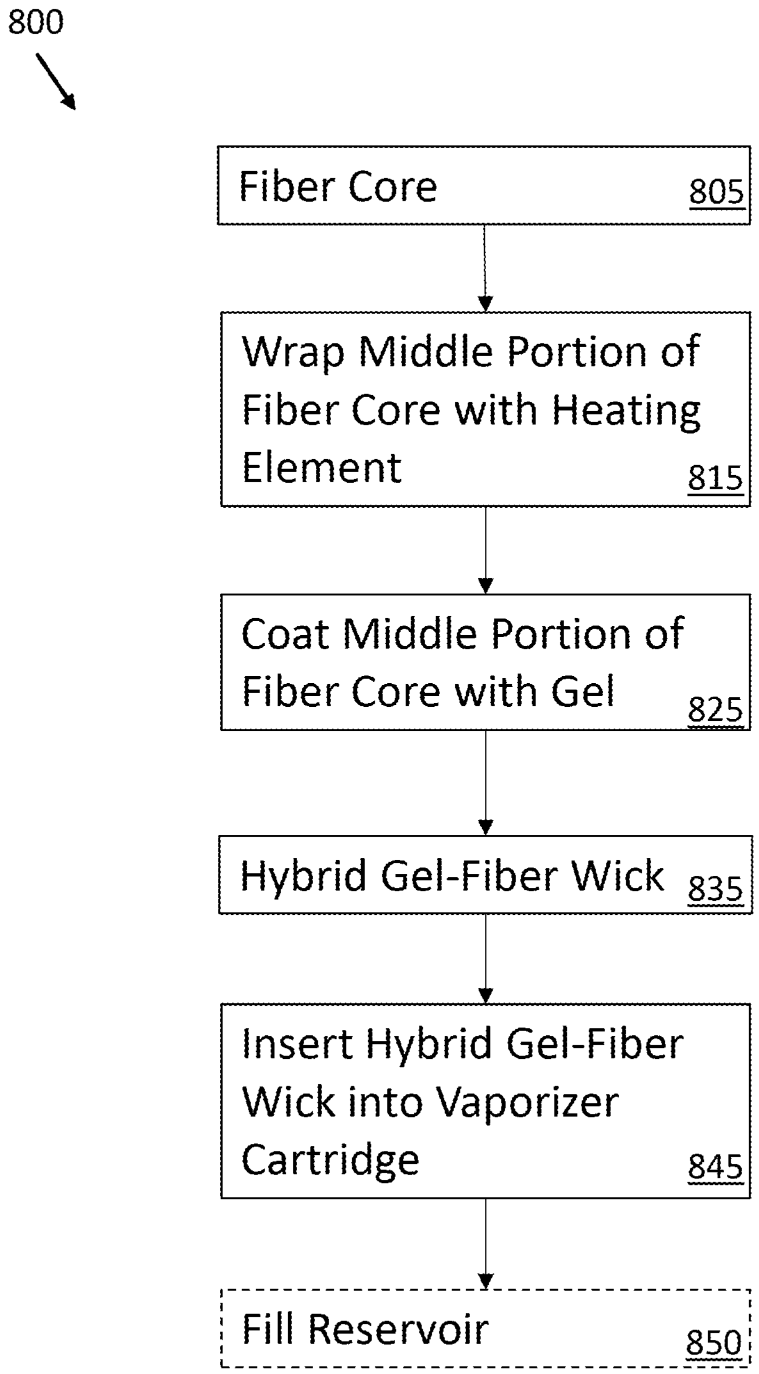
FIG. 8 is a flowchart for a method of manufacturing a vaporizer cartridge consistent with implementations of the present disclosure.

A vaporizer cartridge containing the hybrid gel-fiber wick can be manufactured according to a method 800, as shown in FIG. 8. In step 805, the method includes providing a plurality of fibers bundled together to form a fiber core, the fiber core having a first end portion, a second end portion, and a middle portion therebetween. In step 815, the middle portion of the fiber core is wrapped with a heating element. In step 825, the middle portion of the fiber core can be coated with gel, resulting in forming the hybrid gel-fiber wick in step 835. In step 845, the hybrid gel-fiber wick can be inserted into the vaporizer cartridge, the middle portion of the fiber core being disposed in an atomizer, and the first end portion and the second end portion of the fiber core being disposed in a reservoir of the vaporizer cartridge. In step 850, the reservoir is filled with a vaporizable material.

Terminology

As used herein, the terms “wick” or “wicking element” include any material capable of causing fluid transport (e.g. liquid flow) from one place to another.

When a feature or element is herein referred to as being “on” another feature or element, it can be directly on the other feature or element or intervening features and/or elements can also be present. In contrast, when a feature or element is referred to as being “directly on” another feature or element, there are no intervening features or elements present. It will also be understood that, when a feature or element is referred to as being “connected”, “attached” or “coupled” to another feature or element, it can be directly connected, attached or coupled to the other feature or element or intervening features or elements can be present. In contrast, when a feature or element is referred to as being “directly connected”, “directly attached” or “directly coupled” to another feature or element, there are no intervening features or elements present.

Although described or shown with respect to one embodiment, the features and elements so described or shown can apply to other embodiments. It will also be appreciated by those of skill in the art that references to a structure or feature that is disposed “adjacent” another feature can have portions that overlap or underlie the adjacent feature.

Terminology used herein is for the purpose of describing particular embodiments and implementations only and is not intended to be limiting. For example, as used herein, the singular forms “a,” “an,” and “the” are intended to include the plural forms as well, unless the context clearly indicates otherwise.

In the descriptions above and in the claims, phrases such as “at least one of” or “one or more of” may occur followed by a conjunctive list of elements or features. The term “and/or” may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases “at least one of A and B;” “one or more of A and B;” and “A and/or B” are each intended to mean “A alone, B alone, or A and B together.” A similar interpretation is also intended for lists including three or more items. For example, the phrases “at least one of A, B, and C;” “one or more of A, B, and C;” and “A, B, and/or C” are each intended to mean “A alone, B alone, C alone, A and B together, A and C together, B and C together, or A and B and C together.” Use of the term “based on,” above and in the claims is intended to mean, “based at least in part on,” such that an unrecited feature or element is also permissible.

Spatially relative terms, such as “forward”, “rearward”, “under”, “below”, “lower”, “over”, “upper” and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device can be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers can be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value can have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes can be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Use of the term "based on," herein and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described herein can be directed to various combinations and subcombinations of the disclosed features and/or combinations and subcombinations of several further features disclosed herein. In addition, the logic flows depicted in the accompanying figures and/or described herein do not necessarily require the particular order shown, or sequential order, to achieve desirable results. Other implementations may be within the scope of the following claims.

What is claimed is:

1. A hybrid gel-fiber wick comprising:

a plurality of fibers bundled together to form a fiber core, the fiber core having a first end portion, a second end portion, and a middle portion therebetween;

a gel coating a portion of the fiber core; and a heating element, wherein the gel is in contact with the heating element.

2. The hybrid gel-fiber wick of claim 1, wherein the middle portion of the fiber core is coated by the gel coating.

3. The hybrid gel-fiber wick of claim 1, wherein at least one of the first end portion or the second end portion of the fiber core is not coated by the gel coating.

4. The hybrid gel-fiber wick of claim 1, wherein at least a portion of the heating element is disposed between the fiber core and the gel coating.

5. The hybrid gel-fiber wick of claim 1, wherein the heating element comprises a nichrome wire.

6. The hybrid gel-fiber wick of claim 1, wherein the heating element is spirally wound around the fiber core.

7. The hybrid gel-fiber wick of claim 1, wherein the fiber core comprises a cotton material.

8. The hybrid gel-fiber wick of claim 1, wherein the fiber core comprises a silica material.

9. The hybrid gel-fiber wick of claim 1, wherein the gel comprises a polymer.

10. The hybrid gel-fiber wick of claim 1, wherein the gel comprises at least one of a silicon, silane, silicate, or tetraethoxysilane.

11. The hybrid gel-fiber wick of claim 1, wherein the gel coating is 250 microns to 500 microns in thickness.

12. A cartridge comprising the hybrid gel-fiber wick of claim 1.

13. The cartridge of claim 12, wherein the cartridge further comprises a reservoir configured to contain a vaporizable material, and a portion of the hybrid gel-fiber wick is disposed within the reservoir.

14. The cartridge of claim 13, wherein at least one of the first end portion or the second end portion of the fiber core are disposed within the reservoir.

15. The cartridge of claim 13, wherein the cartridge further comprises an atomizer configured to vaporize the vaporizable material.

16. The cartridge of claim 15, wherein the middle portion of the fiber core is disposed within the atomizer.

17. A device comprising the cartridge of claim 12 and a receptacle configured to receive the cartridge.

* * * * *